US007800785B2

(12) United States Patent
Bala et al.

(10) Patent No.: US 7,800,785 B2
(45) Date of Patent: Sep. 21, 2010

(54) METHODOLOGY FOR SUBSTRATE FLUORESCENT NON-OVERLAPPING DOT DESIGN PATTERNS FOR EMBEDDING INFORMATION IN PRINTED DOCUMENTS

(75) Inventors: Raja Bala, Webster, NY (US); Reiner Eschbach, Webster, NY (US); Shen-Ge Wang, Fairport, NY (US); Yonghui Zhao, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 570 days.

(21) Appl. No.: 11/754,733

(22) Filed: May 29, 2007

(65) Prior Publication Data

US 2008/0297851 A1 Dec. 4, 2008

(51) Int. Cl.
*H04N 1/405* (2006.01)

(52) U.S. Cl. ....................... 358/3.28; 358/3.2; 358/1.18

(58) Field of Classification Search ................ 358/3.28, 358/1.9, 2.1, 3.09-3.14, 3.2, 1.18
See application file for complete search history.

(56) References Cited

U.S. PATENT DOCUMENTS

| | | | |
|---|---|---|---|
| 3,614,430 | A | 10/1971 | Berler |
| 3,900,608 | A | 8/1975 | Dierkes et al. |
| 4,186,020 | A | 1/1980 | Wachtel |
| 5,256,192 | A | 10/1993 | Liu et al. |
| 5,286,286 | A | 2/1994 | Winnik et al. |
| 5,371,126 | A | 12/1994 | Strickler |
| 5,734,752 | A | 3/1998 | Knox |
| 6,773,549 | B1 | 8/2004 | Burkhardt |
| 2004/0021311 | A1 | 2/2004 | Shimada et al. |
| 2004/0233465 | A1 | 11/2004 | Coyle et al. |
| 2008/0299333 | A1 | 12/2008 | Bala et al. |

FOREIGN PATENT DOCUMENTS

JP 2007274736 A * 10/2007

OTHER PUBLICATIONS

European Patent Application No. 08 157 083.0, European Search Report mailed Apr. 21, 2009.

Bala et al., U.S. Appl. No. 11/382,897, filed May 11, 2006, entitled "Substrate Fluorescence Mask for Embedding Information in Printed Documents".

Bala et al., U.S. Appl. No. 11/382,869, filed May 11, 2006, entitled "Substrate Fluorescence Pattern Mask for Embedding Information in Printed Documents".

Gaurav Sharma, Editor, "Digital Color Imaging Handbook"; CRC Press, Boca Raton, FL, 2003, Chapter 5.

* cited by examiner

*Primary Examiner*—Thomas D Lee
*Assistant Examiner*—Stephen M Brinich
(74) *Attorney, Agent, or Firm*—Fay Sharpe LLP

(57) ABSTRACT

The teachings as provided herein relate to a watermark embedded in an image, and methodology for same, that has the property of being relatively indecipherable under normal light, and yet decipherable under UV light. This fluorescent mark comprises a substrate containing optical brightening agents, and a first dot design printed as an image upon the substrate. The first dot design has as a characteristic, the property of strongly suppressing substrate fluorescence. A second dot design having a property of providing a differing level of substrate fluorescence suppression from that of the first dot design such that when rendered in close spatial proximity with the first dot design image print, the resultant image rendered substrate suitably exposed to an ultra-violet light source, will yield a discernable image evident as a fluorescent mark.

21 Claims, 7 Drawing Sheets

FIG. 9a
| | | | | | |
|---|---|---|---|---|---|
| 9 | 7 | 5 | 5 | 7 | 9 |
| 8 | 4 | 3 | 3 | 4 | 8 |
| 6 | 2 | 1 | 1 | 2 | 6 |
| 6 | 2 | 1 | 1 | 2 | 6 |
| 8 | 4 | 3 | 3 | 4 | 8 |
| 9 | 7 | 5 | 5 | 7 | 9 |
FIG. 9b
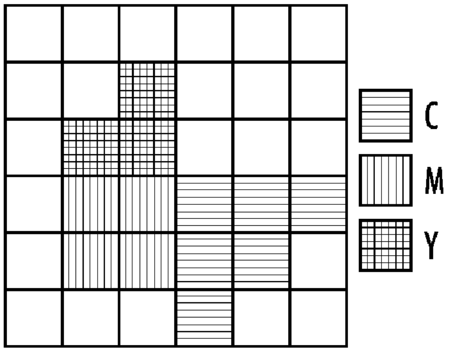
FIG. 9c
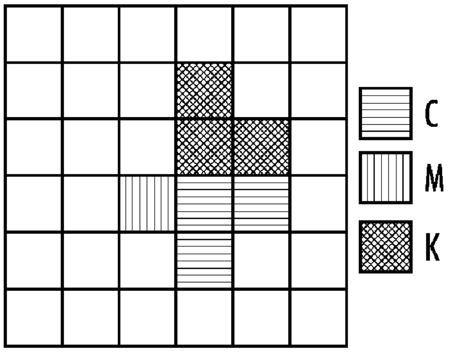

METHODOLOGY FOR SUBSTRATE FLUORESCENT NON-OVERLAPPING DOT DESIGN PATTERNS FOR EMBEDDING INFORMATION IN PRINTED DOCUMENTS

CROSS-REFERENCE TO RELATED APPLICATIONS

Cross-reference is made to the following application filed concurrently herewith and incorporated by reference herein: 11/754,702, entitled "SUBSTRATE FLUORESCENT NON-OVERLAPPING DOT DESIGN PATTERNS FOR EMBEDDING INFORMATION IN PRINTED DOCUMENTS".

Cross-reference is made to the following applications previously filed and which are incorporated by reference herein: U.S. patent application Ser. No. 11/382,897, entitled "SUBSTRATE FLUORESCENCE MASK FOR EMBEDDING INFORMATION IN PRINTED DOCUMENTS"; U.S. patent application Ser. No. 11/382,869, entitled "SUBSTRATE FLUORESCENCE PATTERN MASK FOR EMBEDDING INFORMATION IN PRINTED DOCUMENTS".

BACKGROUND AND SUMMARY

The present invention in various embodiments relates generally to the useful manipulation of fluorescence found in substrates and particularly most paper substrates as commonly utilized in various printer and electrostatographic print environments. More particularly, the teachings provided herein relate to at least one realization of fluorescence watermarks.

It is desirable to have a way to provide detection of the counterfeiting, illegal alteration, and/or copying of a document, most desirably in a manner that will provide document security and which is also applicable for digitally generated documents. It is desirable that such a solution also have minimum impact on system overhead requirements as well as minimal storage requirements in a digital processing and printing environment. Additionally, it is highly desirable that this solution be obtained without physical modification to the printing device and without the need for costly special materials and media.

Watermarking is a common way to ensure security in digital documents. Many watermarking approaches exist with different trade-offs in cost, fragility, robustness, etc. One approach is to use ultra-violet (UV) ink rendering, to encode a watermark that is not visible under normal illumination, but revealed under UV illumination. The traditional approach, often used in currency notes, is to render a watermark with special ultra-violet (UV) fluorescent inks and to subsequently identify the presence or absence of the watermark in a proffered document using a standard UV lamp. One example of this approach may be found in U.S. Pat. No. 5,286,286 to Winnik et al., which is herein incorporated by reference in its entirety for its teachings. However, these inks are costly to employ, and thus are typically only economically viable in offset printing scenarios, and thus only truly avail themselves of long print runs. Additionally, these materials are often difficult to incorporate into standard electro-photographic or other non-impact printing systems like solid ink printers, either due to cost, availability or physical/chemical properties. This in turn discourages their use in variable data printing arrangements, such as for redeemable coupons, for but one example.

Another approach taken to provide a document for which copy control is provided by digital watermarking includes as an example U.S. Pat. No. 5,734,752 to Knox, where there is illustrated a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

For each of the above patents and citations the disclosures therein are totally incorporated herein by reference in their entirety.

Disclosed in embodiments herein is a method for creating a fluorescence mark indicator by selecting a desired colorant combination from within an available color gamut and then deriving a first dot design pattern to provide the desired colorant combination. The first dot design pattern is comprised of substantially non-overlapping primary colorants arranged so as to provide a relatively high paper coverage, and thereby having a property of high suppression of substrate fluorescence. The method further comprises deriving a second dot design pattern to also provide the desired colorant combination for printing. The second dot design pattern is comprised of primary colorants arranged to create a relatively low paper coverage while having substantially similar average color appearance as the first dot design pattern under normal light, and thus having a property of low suppression of substrate fluorescence. This is followed with printing the first dot design pattern and the second dot design pattern in close proximity to each other on a substrate containing optical brightening agents, such that the resultant printed substrate image suitably exposed to an ultra-violet light source, will yield a discernable pattern evident as a fluorescent mark.

Further disclosed in embodiments herein is a method for creating a fluorescence mark indicator by selecting a desired colorant combination from within an available color gamut and then deriving a first dot design pattern to provide the desired colorant combination. The first dot design pattern is comprised of substantially non-overlapping primary colorants including at least the colorant yellow arranged so as to provide a relatively high paper coverage, and thereby having a property of high suppression of substrate fluorescence. The method further comprises deriving a second dot design pattern to also provide the desired colorant combination for printing. The second dot design pattern is comprised of primary colorants, including at least the colorant black, arranged to create a relatively low paper coverage while having substantially similar average color appearance as the first dot design pattern under normal light, and thus having a property of low suppression of substrate fluorescence. This is followed with printing the first dot design pattern and the second dot design pattern in close proximity on a substrate containing optical brightening agents, such that the resultant printed substrate image suitably exposed to an ultra-violet light source, will yield a discernable pattern evident as a fluorescent mark.

Further disclosed in embodiments herein is a method for creating a fluorescence mark indicator by selecting a desired colorant combination from within an available color gamut and then deriving a first dot design pattern to provide the desired colorant combination. The first dot design pattern is comprised of substantially non-overlapping primary colorants including at least the colorant yellow arranged so as to provide a relatively high paper coverage, and thereby having a property of high suppression of substrate fluorescence. The method further comprises deriving a second dot design pattern to also provide the desired colorant combination for printing. The second dot design pattern is comprised of primary colorants, including at least the colorant black, but with a minimized amount of the colorant yellow, arranged to create a relatively low paper coverage while having substantially similar average color appearance as the first dot design pattern under normal light, and thus having a property of low suppression of substrate fluorescence. This is followed with printing the first dot design pattern and the second dot design pattern in close proximity on a substrate containing optical brightening agents, such that the resultant printed substrate image suitably exposed to an ultra-violet light source, will yield a discernable pattern evident as a fluorescent mark.

BRIEF DESCRIPTION OF THE DRAWINGS

FIG. 9 provides schematical depiction of an alternative quadrant dot filling-order pattern, and two colorant fill examples based on that quadrant dot filling-order.

DETAILED DESCRIPTION

Figure 1:
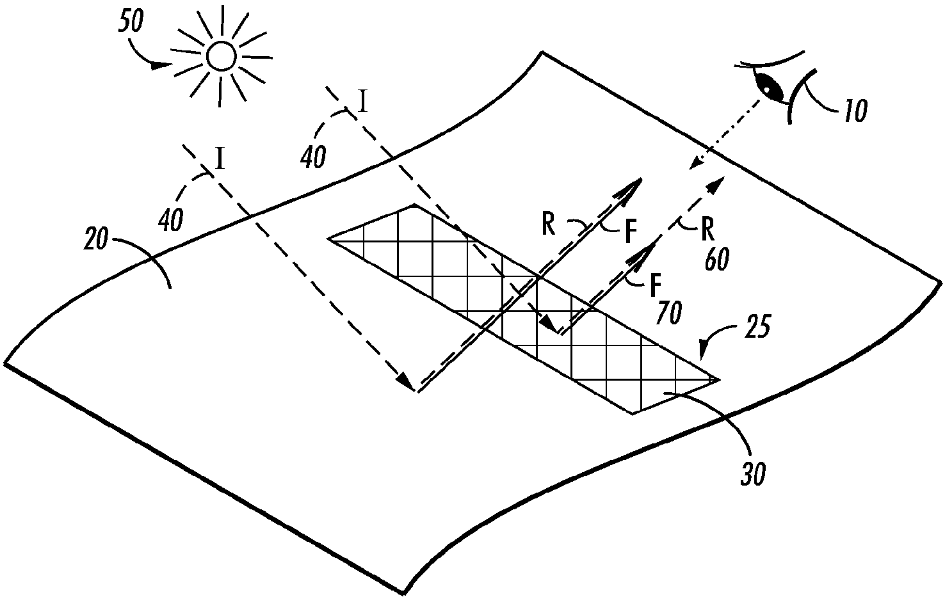
FIG. 1 schematically depicts the resultant observable light from a substrate and colorant patch thereupon.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably. In the event that one term or the other is deemed to be narrower or broader than the other, the teaching as provided herein and claimed below is directed to the more broadly determined definitional term, unless that term is otherwise specifically limited within the claim itself.

In a digital image composed of data representing physical light, each element of data may be called a "pixel", which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation performs "image processing" when it operates on an item of data that relates to part of an image. "Contrast" is used to denote the visual difference between items, data points, and the like. It can be measured as a color difference or as a luminance difference or both. A digital color printing system is an apparatus arrangement suited to accepting image data and rendering that image data upon a substrate.

For the purposes of clarity for what follows, the following term definitions are herein provided:

Colorant: A dye, pigment, ink, or other agent used to impart a color to a material. Colorants, such as most colored toners, impart color by altering the spectral power distribution of the light they receive from the incident illumination through two primary physical phenomenon: absorption and scattering. Color is produced by spectrally selective absorption and scattering of the incident light, while allowing for transmission of the remaining light. For example, cyan, magenta and yellow colorants selectively absorb long, medium, and short wavelengths respectively in the spectral regions. Some colorants, such as most colored toners, impart color via a dye operable in transmissive mode. Other suitable colorants may operate in a reflective mode. For the purposes of discussion in this specification but not to be limited to same, colorant will be taken to be one of the fundamental subtractive C, M, Y, K, primaries, (cyan, magenta, yellow, and black)—which may be realized in formulation as, liquid ink, solid ink, dye, or electrostatographic toner.

Colorant mixture: a particular combination of C, M, Y, K colorants.

Fluorescence mark: A watermark embedded in the image that has the property of being relatively indecipherable under normal light, and yet decipherable under UV light.

There is well established understanding in the printing industry regarding the utilization of fluorescent material inks in combination with ultra-violet light sources as employed for security marks, particularly as a technique to deter counterfeiting. See for example: U.S. Pat. No. 3,611,430 to Berler; U.S. Pat. No. 4,186,020 to Wachtel; and U.S. Pat. No. 5,256,192 to Liu et al., each of which is hereby incorporated by reference in its entirety for its teaching. However, there remains a long-standing need for an approach to such a technique which will provide the same benefit but with lower complexity and cost, particularly in a digital printing environment, and using only common consumables as well. Herein below, teaching is provided regarding how the fluorescent properties found in paper substrates, may be suitably masked by the toners applied thereupon so as to render a distinct image viewable under ultra-violet light, and which otherwise may never-the-less, escape the attention of an observer under normal lighting.

FIG. 1 shows how the human eye of an observer 10 will respond to the reflectance characteristics of bare paper substrate 20 versus the reflectance characteristics of a patch 25 of suitably selected colorant or colorant mixture 30 as deposited upon the same substrate 20. The "I" term depicted as dashed arrows 40 represents incident light directed from light source 50. The "R" term depicted as dashed arrows 60 represents normal reflection, while the "F" term depicted as solid arrows 70 represents the radiated fluorescence from substrate 20 caused by the UV component in the incident light from light source 50.

As can be seen in FIG. 1, incident light 40 when it strikes an open area of the substrate 20 provides amounts both of normal light reflection as well as radiated fluorescence. However, when incident light 40 strikes patch 25 of suitably selected deposited colorant mixture 30 there can be significantly less radiated fluorescence 70, than there is of normal reflection 60 depending on the colorant or colorant mixture chosen. One example of a suitably selected colorant 30 providing significantly less radiated fluorescence is a yellow toner as employed in electrostatographic, ink-jet, and wax based printing apparatus. In the alternative however, other colorants or colorant mixtures may be selected for rendering which do not suppress the radiated fluorescence of the substrate 20 as strongly, such as for example a cyan or magenta colorant.

Figure 2:
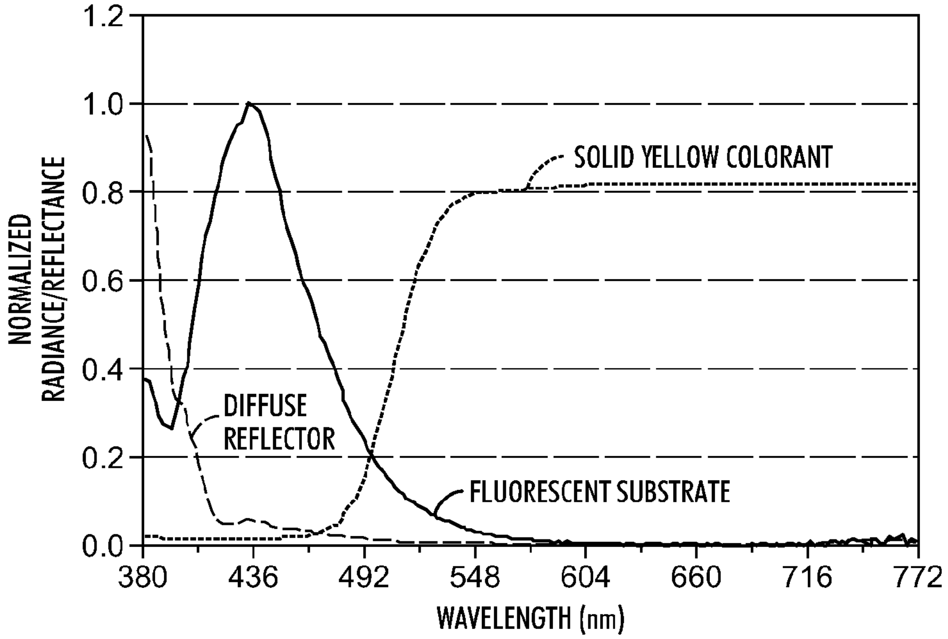
FIG. 2 shows a graph of normalized radiance and reflectance as a function of wavelength for a solid yellow colorant, a fluorescent substrate, and a diffuse reflector.

FIG. 2 provides a graph of light wavelength versus normalized radiance/reflectance. The spectrum data here was obtained by placing a typical substrate in a light booth illuminated with purely UV light, and measuring the reflected radiance with a Photoresearch PR705 spectroradiometer. As a reference, the figure also includes the spectral radiance from a non-fluorescent barium-sulfate diffuse reflector. It is clearly seen that the fluorescence spectrum has most of its energy in the shorter (or "blue") wavelengths. As may be seen in FIG. 2, by examining the radiance of a fluorescent substrate (as represented by the solid trace line here), it can be seen that the normalized radiance of a typical white substrate 20 peaks at approximately 436 nanometers. OBA (optical brightening agents) are commonly employed in the manufacture of white paper to make the paper whiter and are found in amounts corresponding to the "whiteness" or "brightness" of the paper. See for example: U.S. Pat. No. 3,900,608 to Dierkes et al.; U.S. Pat. No. 5,371,126 to Strickler; and U.S. Pat. No. 6,773,549 to Burkhardt, each of which is hereby incorporated by reference in its entirety for its teaching. Indeed paper is now often marketed with a numeric indication of its brilliance. Virtually all xerographic substrates contain some amount of OBAs. Indeed it should be noted that other colored paper substrates have been found to exhibit similar properties in differing amounts. Yellow paper in particular has been empirically found to be comparable to many white paper substrates.

In distinction with the fluorescing substrate, the solid yellow colorant (as indicated by the dotted line in FIG. 2) provides very low radiance/reflectance of the light fluorescing in the paper substrate for the range below approximately 492 nanometers. In effect a yellow colorant deposited upon a fluorescing substrate masks the fluorescing of that substrate where so deposited. Note as point of reference the response for a diffuse reflector (indicated in FIG. 2 as a dashed line). As noted above the response for other colorants differs from the yellow colorant. A listing of the approximate comparative quality of the C, M, Y, and K, colorants as to their UV masking and perceived relative luminance characteristics is provided in the following table:

| Toner Colorant | UV Absorption/ Fluorescence Suppression | Blue Absorption | Perceived Intensity Absorption or Perceived Luminance Impact |
|---|---|---|---|
| Black | High | High | High |
| Cyan | Low-medium | Low | High |
| Magenta | Low-medium | Medium | Medium |
| Yellow | High | High | Low |

The above noted and described teachings when suitably employed, present a UV-based watermarking technique that as taught herein uses only common consumables. The technique is based on the following observations: 1) common substrates used in digital printing contain optical brighteners that cause fluorescence; 2) the standard colorants act as an effective blocker of UV-induced emission, with the yellow colorant commonly being the strongest inhibitor; 3) the yellow colorant in addition to being a strong inhibitor of UV-induced emission, also exhibits very low luminance contrast under normal illumination. This is because yellow absorbs in the blue regime of the visible spectrum, and blue does not contribute significantly to perceived luminance.

The technique as taught herein works by finding colorant mask patterns that produce similar R (normal reflection) and thus are hard to distinguish from each other under normal light, while also providing very dissimilar F (radiated fluorescence) and thus displaying a high contrast from one another under UV light. In one example embodiment this makes the yellow colorant mixtures in patterns combined with distraction patterns in close proximity ideal candidates for embedding information in a document printed on a typical substrate. When viewed under normal lighting, the yellow watermark pattern is difficult to visually separate from the distraction pattern. When viewed under UV light, the watermark is revealed due to the fact that yellow colorant mixture pattern exhibits high contrast against the fluorescent substrate. Since the technique uses only common substrates and colorants, it is a cost-effective way of ensuring security markings in short-run/customized digital printing environments. Additionally, there are a wide variety of UV light sources, many of them inexpensive and portable, thus making the detection of a fluorescence mark in the field easy and convenient.

Note that the proposed technique is distinct from the conventional offset approach in that instead of fluorescence emission being added via application of special inks, fluorescence emission from the substrate is being subtracted or suppressed using yellow or some other colorant or colorant mixture. In that sense, the technique described herein is the logical 'inverse' of existing methods; rather than adding fluorescent materials to parts of a document, a selective suppression or masking of the substrate fluorescence effect is employed instead.

To quantify the contrast induced by the yellow colorant, several luminance measurements were made of solid yellow vs. plain substrate used in a XEROX® DocuColor12™ printer. Two substrates were selected: Substrate 1 contains a large amount of optical brightener, and Substrate 2 contains very little optical brightener. Luminance measurements were made under three illuminants: i) D50 ii) UV iii) D50 with a blue filter. The latter was intended to represent a known practice of using the blue channel to extract information in the yellow colorant. The luminance ratio $Y_{white}/Y_{yellow}$ was used as a simple measure of contrast or dynamic range exhibited by the yellow colorant. The data is summarized in the following table:

Luminance dynamic range obtained from yellow on white paper under different illuminants.

| | $Y_{paper}/Y_{yellow}$ | |
|---|---|---|
| | Substrate 1 (high fluorescence) | Substrate 2 (low fluorescence) |
| D50 (Daylight) | 1.23 | 1.15 |
| UV | 12.7 | 1.61 |
| D50 with blue filter | 6.89 | 5.09 |

Several observations can be made from this data: 1) The contrast obtained from yellow on a fluorescent substrate increases by an order of magnitude when switching from daylight to UV illumination. This suggests that yellow can act as an effective watermark on fluorescent substrate, and UV light can be used as the "watermark key"; 2) Under UV illumination alone, the substrate fluorescence plays a significant role in the resulting contrast. This is evidenced in the second row of the table. Thus the substrate is a contributor in the proposed watermarking process, i.e. if a user illegally reproduces a document on the wrong type of substrate, the visibility of the watermark will be affected; and, 3) The contrast achieved by a fluorescent substrate under UV is about twice that achieved with a standard blue filter. This indicates that the fluorescence-based approach can be far more effective than standard approaches that use data only from the visible spectrum.

Figure 3:
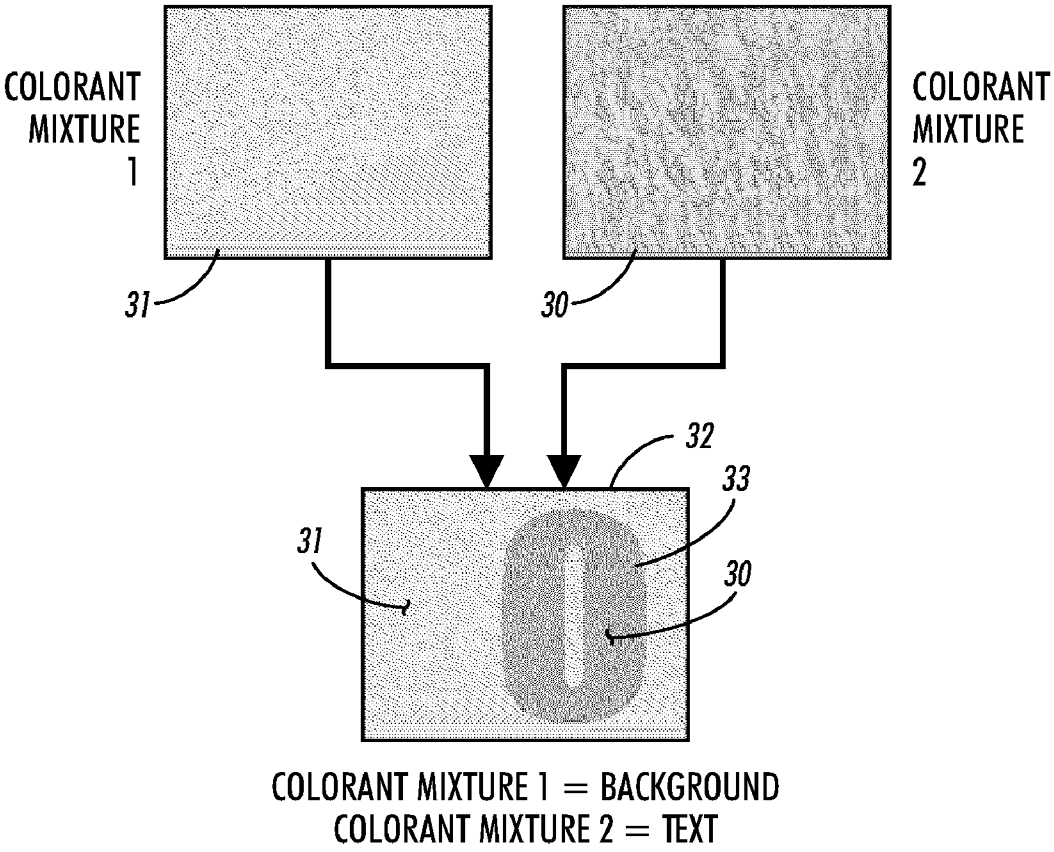
FIG. 3 provides depiction of one approach utilizing colorant or colorant mixtures as applied in the rendering of an example alphanumeric character.

FIG. 3 provides depiction for application of the principle teachings enumerated above. In FIG. 3, a colorant mixture-1 is selected and applied to patch area 33, which here is arranged in this example as the alphanumeric symbol "O". Further, a colorant mixture-2 is selected and applied to patch area 32 arranged here in substantially close spatial proximity to patch area 33, and thereby effecting a background around patch area 33. Both colorant mixture-1 and mixture-2 are comprised of suitably selected colorant or colorant mixtures 31 and 30 respectively.

Each colorant mixture 31 or 30 may be either a single CMYK colorant or any mixture of CMYK colorants. They will however, not both be comprised of the same identical single colorant or colorant mixture. Indeed for example, in one embodiment, colorant mixture 31 will be selected so as to provide higher fluorescence suppression than that selected for colorant mixture 30. However, in a preferred arrangement the colorant mixtures 30 & 31 will be selected most optimally to match each other closely in their average color under normal light, while at the same time differing in their average fluorescence suppression. Thus, under normal illumination, area 32 will look to a human observer as a constant or quasi constant color, while under UV illumination area 32 would separate into two distinct areas represented by colorant mixtures 30 and 31, exhibiting a clear visual contrast. It should be noted as will be well understood by those skilled in the art that interchanging the colorant mixtures 30 and 31 simply leads to an inversion of the contrast, e.g.: light text on a dark background would change to dark text on a light background, and that this inversion is contemplated as a further embodiment even if not explicitly depicted in the drawings.

For example an approximate 50% grayscale gray colorant mixture may be realized with a halftone of black colorant only. This may then be matched against a colorant mixture comprising a high amount of yellow mixed with enough cyan and magenta to yield a similar approximate 50% grayscale gray colorant mixture. However, with the given high content of yellow colorant amount this matched mixture will provide much higher absorption of UV or suppression of native substrate fluorescence. Thus and thereby two colorant mixtures may be realized which while appearing quite nearly identical under normal viewing illumination, will never-the-less appear quite different under UV lighting.

Further, as will be understood by those skilled in the art, this may be approached as an intentional exploitation of metamerism to reproduce the same color response from two different colorant mixtures under normal viewing illumination. Mixtures which are optimized to vary sufficiently in their average fluorescence suppression but are otherwise a close metameric match under normal room lighting.

The above-described approach while effective never-the-less may sometimes be discernable without an UV light source to those observers consciously aware, and on the look-out for, or expecting such a fluorescent mark. This can for example be caused by a deviation of the illuminant from the originally intended illuminant of the design, a change in the substrate characteristics, an incorrect match due to printer imprecision/drift, and/or an incorrect match due to inherent calibration limitations. What is described herein below is a further technique which makes a fluorescent mark that is increasingly difficult and even impossible for an unaided eye to discern absent the necessary UV light source by virtue of employing a mosaic array of an exemplary dot design.

As is described further detail below there is provided an UV encryption scheme that directly optimizes primary (C, M, Y, K) dot patterns, rather than contone values. This yields a marked simplicity and improvement over the previous and the above-mentioned methods in the ability to match colors under normal illumination, while showing visible contrast under UV light. Each pattern comprises a mosaic of solid non-overlapping primaries C, M, Y, K, and bare paper. A first empirical model is derived that predicts the color of these patterns under normal light. A second empirical model is derived that predicts luminance under UV light. In one exemplary approach, the UV luminance is predicted by considering only the fractional area coverage of bare paper. These models are fed to an optimization routine that determines pairs of patterns minimizing color difference while maximizing UV contrast.

FIGS. 4 through 9 provide depiction of further example embodiments. The arrangement here is intended to make any casual observation of a fluorescent mark more difficult to discern by the lay observer. This is achieved as a consequence flowing from the introduction of two different directly optimized primary (C, M, Y, K) dot patterns arranged in a mosaic being utilized, rather than an approach based on contone values. This yields a marked improvement in simplicity of implementation as well as an improvement over the above-described methods in the ability to consistently provide matched colors under normal illumination, while showing visible contrast under UV light.

Figure 4:
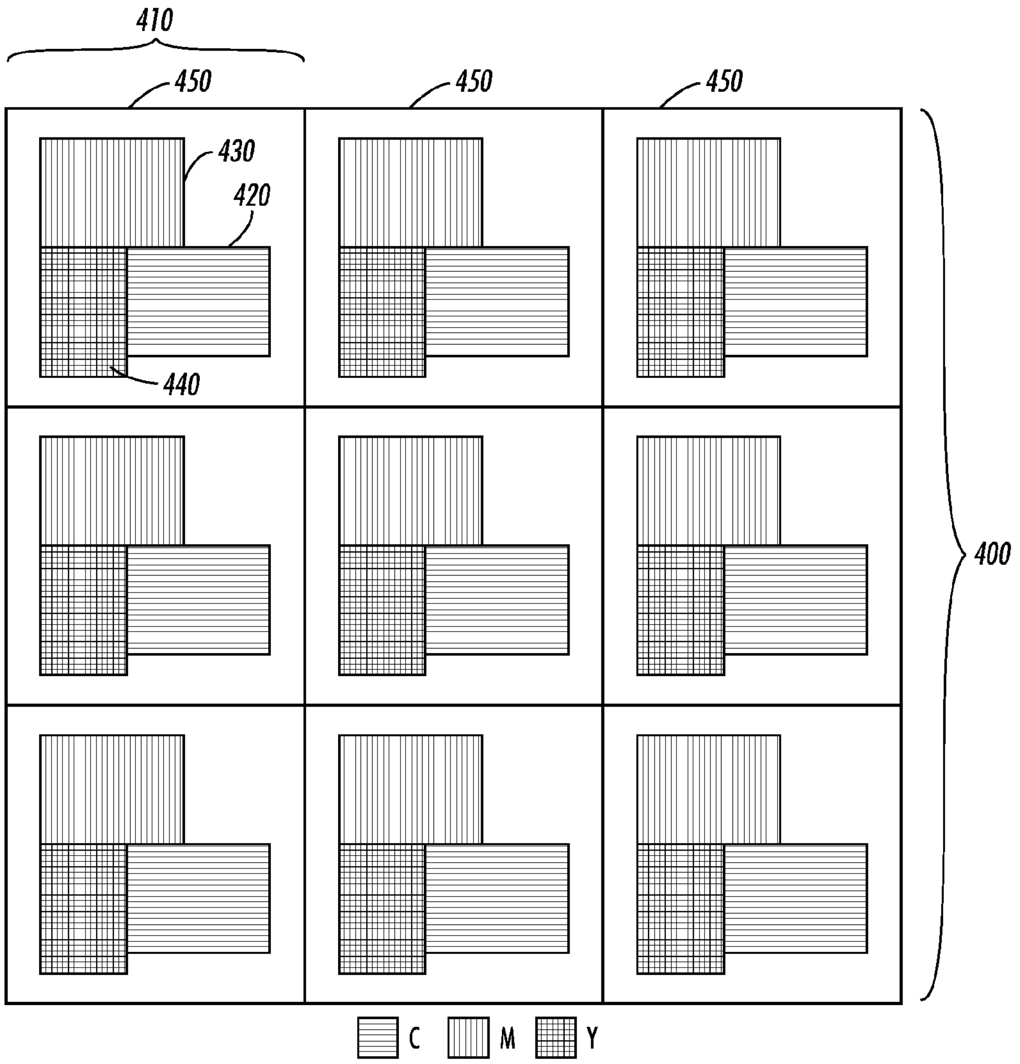
FIG. 4 provides schematical depiction of a dot design which maximizes the suppression of substrate florescence for a given grayscale level.

FIG. 4 depicts as shown schematically, one such mosaic of solid non-overlapping C, M, Y, K dots and bare paper (P). An array 400 of dots 410 are arranged. The array pattern is depicted only as a three by three, nine cell arrangement in this drawing for illustrative purposes, but as will be self evident to one skilled in the art, this repeating array would be expanded or contracted as needed to fill a given patch area, as for example the patch area portions of area 30, be it either patch area 32 or patch area 33. Dot 410 is provided with relatively larger area proportions of cyan 420, magenta 430 and yellow 440, no black, and as a result correspondingly less bare paper area. The bare paper area here will defined as the area within the delineated box 450 minus the combined area of cyan 420, magenta 430 and yellow 440.

Figure 5:
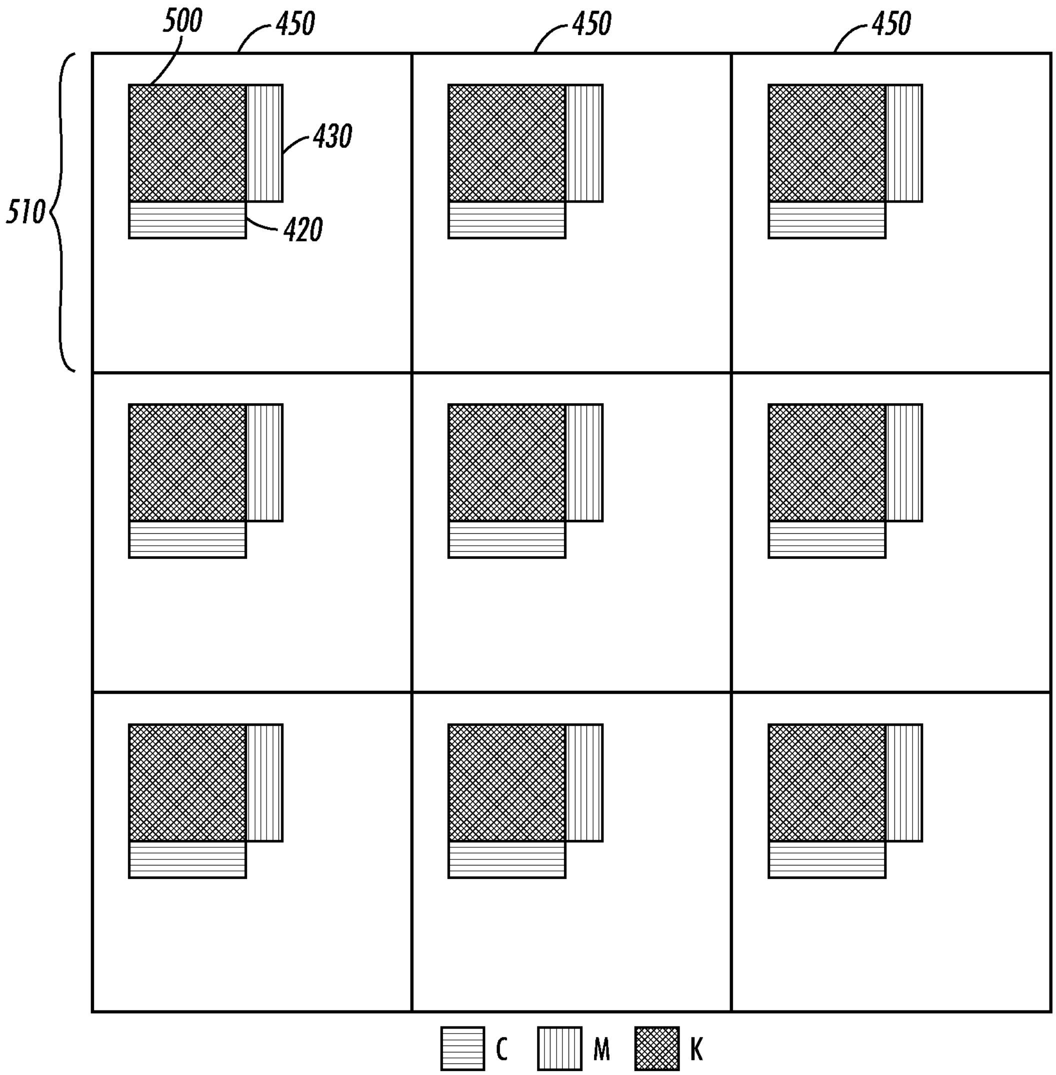
FIG. 5 provides schematical depiction of a dot design which minimizes the suppression of substrate florescence for a grayscale level matching that of FIG. 4.

Contrast this with the dot 510 of FIG. 5 having the same grayscale value but decidedly different colorant mix. Notice the absence here of yellow in 510. Note also the introduction and relative greater area predominance of black 420. The cyan 420 and magenta 430 areas of dot 510 are now greatly reduced in their relative coverage area proportions. The open bare paper area (P) is now much greater as a result as well.

As such dot 410 of FIG. 4 will minimize or suppress the UV florescence of a paper substrate while the dot 510 of FIG. 5 will by way of minimum paper coverage and the absence of yellow 440 allow the highest level of UV florescence for a given substrate. Never-the-less these two dot designs will under normal room lighting, look the same to the unaided eye, and appear to be the same grayscale. By swapping or toggling between these two suitable deigned dots 410 and 510 as driven by a desired UV discernable pattern, much as was done with the colorant mixtures 1 and 2 of FIG. 3, thus placing them into substantially close and spatially proximate patch areas 32 and 33, a florescence mark may be rendered which shall be viable under UV light but not normal room lighting. An exemplary approach to the design of dots 410 and 510 follows.

To start a dot pattern design first let the variables C, M, Y, K, P (cyan, magenta, yellow, black, and paper) denote the fractional area coverage of the 4 colorants and bare paper, where they are made to satisfy the following constraints:

$$C+M+Y+K+P=1 \tag{1a}$$

$$0 \leqq C,M,Y,K,P \leqq 1 \tag{1b}$$

An additional constraint for the dot designs as taught herein is that there is no spatial overlap among the C, M, Y, K dots. Note, that as will be apparent to one skilled in the art, there are numerous spatial arrangements of dot patterns that can be made to satisfy the above constraints. One such dot design pattern embodiment uses a successive filling vector halftoning approach. With this method, we begin at the center of a halftone cell, and move gradually towards the periphery, filling in one colorant at a time according to its fractional area coverage.

Figure 6:
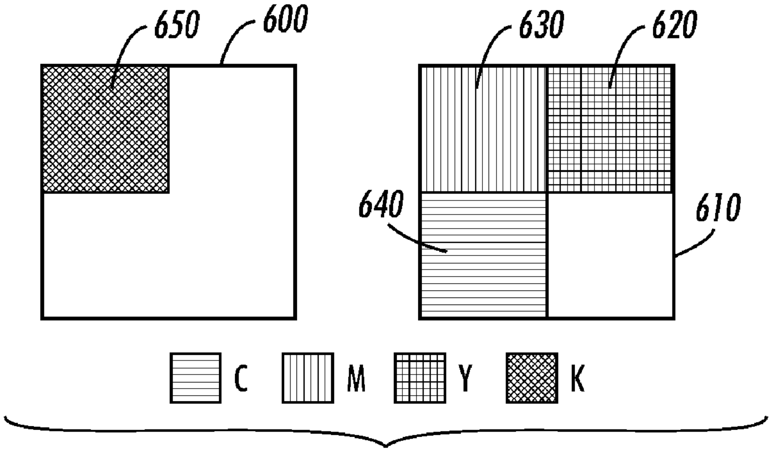
FIG. 6 provides schematical depiction of two schematical dot designs one of which utilizing CMY minimizes the suppression of substrate florescence, and the other utilizing B maximizes the suppression of substrate florescence each at the same grayscale level.

This dot pattern design embodiment is illustrated in FIG. 6 where two identically sized cells 600 and 610 are rendered using only K (650) in 600 or a combination of the colorants C (640), M (630) and Y (620) in 610 that in this simplified drawing will both yield identical visual stimulus under the standard illuminant, but a significantly different response under UV illumination, as described above.

Figure 7:
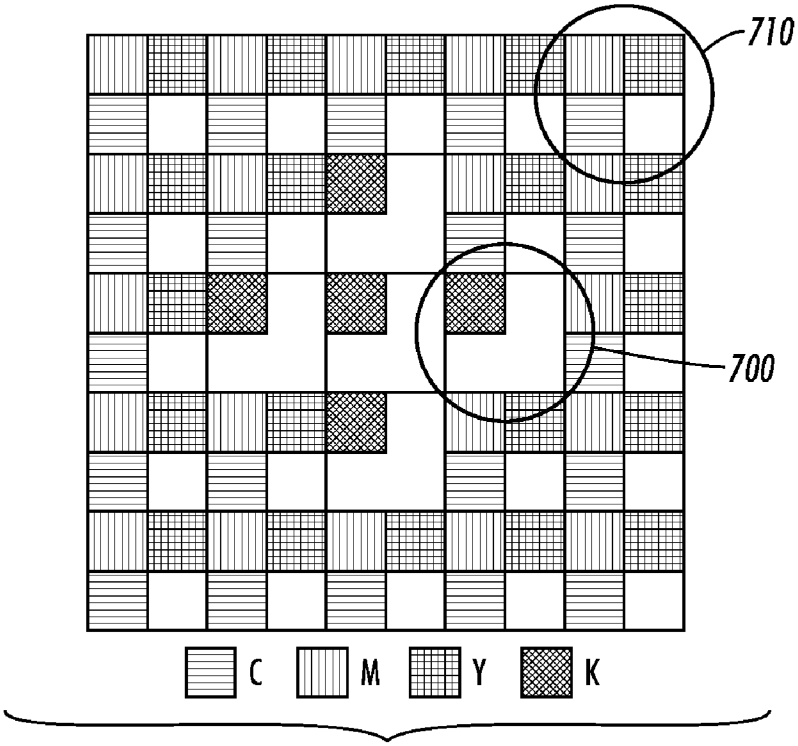
FIG. 7 provides depiction of a "+" sign employing the dot designs of FIG. 6.
Figure 8A:
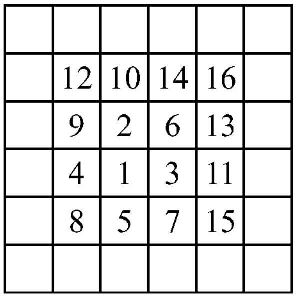
FIG. 8 provides schematical depiction of a dot filling-order pattern and three example colorant fills.
Figure 8B:
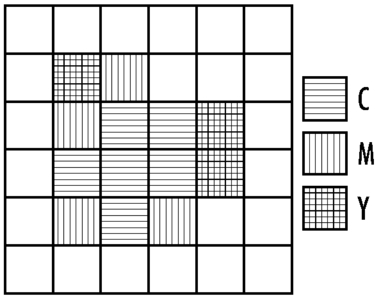
Figure 8C:
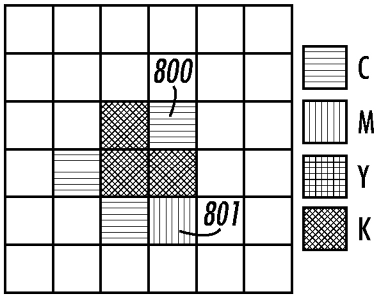
Figure 8D:
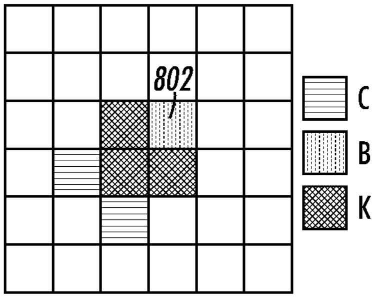

Thus a UV mark can now be encoded by selecting or toggling between two different cell design renderings as is depicted by example in FIG. 7. Here the background pattern is composed of background cell 710 and the desired image signal is composed of foreground cell 700. The desired image signal in this FIG. 7 example being a "+" sign. Under standard illumination conditions the five foreground cells 700 delineating the "+" sign are not visible. However, under UV illumination the five foreground cells 700 will appear markedly different, in this case "brighter" than the surrounding patch formed from background cells 710.

The exact distribution of the colorants CMYK inside each cell is described with the depiction provided in FIGS. 8 and 9. It should be noted that the dot cell filling order follows standard halftone procedures well known to those skilled in the art of digital printing. One such filling order is shown in FIG. 8*a*, which is commonly referred to as a 37 level, 0 degree cluster screen, since it encompasses a repeat cell of 6×6 and the fill order, indicated by the numbering up to element/pixel 16, is clustered. Assume for illustration that the low UV colorant combination according to e.q., (1a) would consist of 6 cyan pixels, 4 magenta pixels and 3 yellow pixels. Combined with the indicated fill order and using the arbitrary convention of filling cyan before magenta before yellow, we would obtain the cell shown in FIG. 8*b*. In an idealized case, the same color achieved in FIG. 8*b*, could be achieved instead with 3 black pixels, 3 cyan pixels and 1 magenta pixel as is shown in FIG. 8C. Taking this further, a similar color result can be achieved by replacing the cyan 800 and magenta 801 pixel components by providing a blue pixel 802, by the superposition of cyan and magenta at that location, resulting in the pixel distribution shown in FIG. 8*d*.

It is important to recognize that the exact fill order and the use of blue or other secondary colors, i.e.: combinations of primary colorants, is a function empirically dominated by the actual target printing device. In a printing device with a maximum colorant coverage of 100%, the structure of FIG. 8*c* would be used, in a printing device with a maximum colorant coverage of 200%, the structure of FIG. 8*d* would be used. The physical requirements for a specific output device with respect empirical selection as to cell size, area coverage and fill order are well known design decisions for those skilled in the art of halftoning, and as such will be readily applied to the additional colorant requirements as taught and described in this specification.

FIG. 9*a* shows a simplification of the filling scheme described above, where here, the colorants are filled independent of each other, and with each colorant starting at its own quadrant of the cell. Note that fill numbers higher than 9 have been omitted in the figure since they would protrude into a neighboring cell, nevertheless, in an actual implementation, all colorants can have, as in this example, 36 pixel locations filled. The advantage of this structure is that any boundary line between the different colorants is minimized. Since boundary lines between different elements are often the cause of non-linearity's and instabilities, this can be beneficial in some printing systems. However, as will also be obvious for those skilled in the art that there is the disadvantage of an increase in the irregularity of the overall outline. FIG. 9*b* provides depiction of one example of such a quadrant fill dot design for suppressing the UV florescence of a substrate much as example dot 410 of FIG. 4 as described above did. Correspondingly, FIG. 9*c* provides depiction of one example of such a quadrant fill dot design allowing the UV florescence of a substrate much as example dot 510 of FIG. 5 did above.

For the above-described zero-overlap dot scheme, an empirical model may be derived that predicts the average color (e.g. CIELAB) of an arbitrary CMYKP combination under normal light. A dense target of color patches that satisfy constraints 1a and 1b is printed and measured. The color of an arbitrary CMYKP combination (satisfying constraints 1a and 1b and built with the same spatial dot scheme) can be predicted from the target training samples by any known fitting or regression technique. Distance-weighted regression was used in one exemplary embodiment. Note that the constraint of zero-overlap greatly restricts the attainable color space of the available CMYK combinations, and thus simplifies the characterization problem.

Next, a second model is derived that predicts luminance under UV light for arbitrary CMYKP combinations. Several UV modeling techniques have been previously derived, with varying degrees of sophistication and accuracy. Recent experiments have however revealed that for non-overlapping primary dot design patterns with high paper area coverage (e.g. P>0.5), paper coverage itself is a very good first-order approximation of UV luminance. This approximation effectively assumes that the C, M, Y, and K colorants all absorb 100% of the paper fluorescence. Another interpretation is that the difference in luminance between any pair of colorants is assumed to be negligible compared to the difference between any colorant and bare paper. This assumption greatly simplifies the UV characterization process, avoiding the need for expensive and laborious measurements of printed samples under UV light, and is thus used in an exemplary embodiment.

In situations where paper area coverage does not provide an adequately accurate approximation of luminance under UV light, other approximations can be derived that offer intermediate trade-offs between accuracy of prediction and required cost and labor. In an alternate embodiment, luminance under UV light is measured for only solid C, M, Y, K patches and bare paper. A simple printer model is then used to predict UV luminance for arbitrary CMYK combinations. The printer model predicts overall luminance as a weighted average of the luminance measurements of solid C, M, Y, K. The weights are derived from the C, M, Y, K fractional area coverage amounts, which can in turn be estimated from input C, M, Y, K digital amounts using known techniques. [see "Digital Color Imaging Handbook" Gaurav Sharma, Editor; Chapter 5, incorporated by reference herein for its teachings]. The relationship between digital count and resulting area coverage is often a nonlinear function due to a variety of factors, including mechanical and optical dot gain. It is customary to derive the nonlinear function from color measurements of single-colorant ramps. Since a goal is to minimize the number of measurements to be made under UV light, an alternative solution is to estimate the area coverage from the characterization derived for normal light, with the assumption that these are physical quantities that are invariant with respect to viewing illuminant.

Note that with the aforementioned approach, only five radiometric measurements under UV light are required. Furthermore, measurements of solid colors are usually stable over time, and across halftones and other imaging and marking parameters. Consequently these measurements can be made just once and stored for each printer.

Then having the above models for predicting color under normal and UV light, the final task is to determine pairs of dot design patterns that achieve the stated objective of minimizing color difference while maximizing UV lightness difference. Denote for example such a pair of patterns as P1 and P2. We first determine P1 to be a colorant combination that satisfies 1a and 1b, as well as the following:

$$P>0.5 \quad (2)$$

$$K>0.1 \text{ OR } \min(C,M,Y)>0.1 \quad (3)$$

Constraint (2) is included so that paper area coverage can be used as a reliable indicator of UV luminance. Constraint (3) is chosen based on the intuition that UV contrast is largely obtained by a differential in paper area coverage, which in turn is effected by trading off pure K vs. a combination of C, M, Y.

Given a choice of P1, we now derive P2 to meet the stated goal of color matching and UV contrast. This can be phrased as one of two dual optimization problems:

i) minimize normal color difference (i.e. CIELAB ΔE) subject to UV lightness difference being greater than a threshold;

ii) maximize UV lightness difference subject to CIELAB ΔE being less than a threshold In one exemplary approach, both strategies are executed, and the better of the two solutions is chosen (i.e. the one with smaller ΔE difference and/or greater UV lightness difference).

In a further exemplary embodiment, the pure primary colorants CMYK are augmented by the additional Neugebauer primaries Red, Green and Blue, modifying constraint formula 1a above accordingly. The above-described two colorant combinations, the first being of high suppression of substrate UV fluorescence and second being of low suppression of substrate UV fluorescence, can now be found by selecting the high suppression of substrate UV fluorescence as described above, whereas the case of low suppression of substrate UV fluorescence is modified to maximally replace the pure colorants C, M, Y preferably with Neugebauer primaries Red, Green and Blue, under the maintained requirement that the difference between the two colorant combinations under normal illumination is below the threshold defined for the application.

While the above embodiment describes only one method (i.e. successive filling) for generating the dot design patterns, many other variations can be conceived. The approach can be extended to halftone screen design, so that the florescence mark can be embedded to images, at least in selected color regions. Also, extending the primaries to include other so-called Neugebauer primaries (i.e. adding red, green, blue, etc.) would provide additional degrees of freedom in the optimization, albeit at the expense of added complexity. Finally, distraction patterns can be added to the proposed scheme to reduce color differences observed under normal light.

Thus as discussed and provided above is a watermark embedded in an image that has the property of being nearly indecipherable by the unaided eye under normal light, and yet decipherable under UV light. This fluorescent mark comprises a substrate containing optical brightening agents, and a first dot design pattern printed as an image upon the substrate. The first dot design pattern has as a characteristic, the property of high suppression of substrate fluorescence. A second dot design pattern exhibiting as a characteristic the low suppression of substrate fluorescence, is printed in close spatial proximity to the first dot design colorant mixture pattern, such that the resulting rendered substrate suitably exposed to an ultra-violet light source, will yield a discernable pattern evident as a fluorescence mark.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. Method for creating a fluorescence mark indicator comprising:

selecting a desired colorant combination from within an available color gamut;

deriving a first dot design pattern to provide the desired colorant combination, the first dot design pattern comprised of substantially non-overlapping primary colorants arranged so as to provide a relatively high paper coverage, the resultant first dot design pattern thus having a property of high suppression of substrate fluorescence;

deriving a second dot design pattern to also provide the desired colorant combination for printing, the second dot design pattern further comprised of primary colorants arranged to create a relatively low paper coverage while having substantially similar average color appearance as the first dot design pattern under normal light, the resultant second dot design pattern thus having a property of low suppression of substrate fluorescence; and, printing the first dot design pattern and the second dot design pattern in close proximity to each other on a substrate containing optical brightening agents such that the resultant printed substrate image suitably exposed to an ultra-violet light source, will yield a discernable pattern evident as a fluorescent mark.

2. The method for creating the fluorescent mark indicator of claim 1 further comprising where the first dot design pattern and the second dot design pattern are a close metameric color match under normal illumination but remain visually distinct in their response under ultra-violet light.

3. The method for creating the fluorescent mark indicator of claim 1 wherein the first dot design pattern and the second dot design pattern are derived from a first printer model that predicts a perceived color signal under normal light and a second printer model that predicts a perceived color signal under UV light.

4. The method for creating the fluorescent mark indicator of claim 3 wherein the perceived color signal under UV light predicted by the second printer model is based upon luminance or a direct correlate thereof.

5. The method for creating the fluorescent mark indicator of claim 3 wherein the second printer model predicts UV luminance by calculating the fractional area coverage of the paper substrate.

6. The method for creating the fluorescent mark indicator of claim 5 wherein the second printer model predicts UV luminance as a weighted average of the UV luminance of solid C, M, Y, K and bare substrate, wherein the weights in the weighted average calculation are derived from fractional area coverage of C, M, Y, K and bare substrate.

7. The method for creating the fluorescent mark indicator of claim 6 wherein the fractional area coverage of C, M, Y, K and bare substrate are obtained from characterization measurements obtained for the case of normal light.

8. Method for creating a fluorescence mark indicator comprising:

selecting a desired colorant combination from within an available color gamut;

deriving a first dot design pattern to provide the desired colorant combination, the first dot pattern design comprised of substantially non-overlapping primary colorants including at least the colorant yellow, arranged so as to provide a relatively high paper coverage, the resultant first dot design pattern thus having a property of high suppression of substrate fluorescence;

deriving a second dot design pattern to also provide the desired colorant combination for printing, the second dot design pattern further comprised of primary colorants including at least the colorant black, arranged to create a relatively low paper coverage while having substantially similar average color appearance as the first dot design pattern under normal light, the resultant second dot design pattern thus having a property of low suppression of substrate fluorescence; and, printing the first dot design pattern and the second dot design pattern in close proximity to each other on a substrate containing optical brightening agents such that the resultant printed substrate image suitably exposed to an ultra-violet light source, will yield a discernable pattern evident as a fluorescent mark.

9. The method for creating the fluorescent mark indicator of claim 8 further comprising where the first dot design pattern and the second dot design pattern are a close metameric color match under normal illumination but remain visually distinct in their response under ultra-violet light.

10. The method for creating the fluorescent mark indicator of claim 8 wherein the first dot design pattern and the second dot design pattern are derived from a first printer model that predicts a perceived color signal under normal light and a second printer model that predicts a perceived color signal under UV light.

11. The method for creating the fluorescent mark indicator of claim 10 wherein the perceived color signal under UV light predicted by the second printer model is based upon luminance or a direct correlate thereof.

12. The method for creating the fluorescent mark indicator of claim 10 wherein the second printer model predicts UV luminance by calculating the fractional area coverage of the paper substrate.

13. The method for creating the fluorescent mark indicator of claim 12 wherein the second printer model predicts UV luminance as a weighted average of the UV luminance of solid C, M, Y, K and bare substrate, wherein the weights in the weighted average calculation are derived from fractional area coverage of C, M, Y, K and bare substrate.

14. The method for creating the fluorescent mark indicator of claim 13 wherein the fractional area coverage of C, M, Y, K and bare substrate are obtained from characterization measurements obtained for the case of normal light.

15. Method for creating a fluorescence mark indicator comprising:

selecting a desired colorant combination from within an available color gamut;

deriving a first dot design pattern to provide the desired colorant combination, the first dot design pattern comprised of substantially non-overlapping primary colorants including at least the colorant yellow, arranged so as to provide a relatively high paper coverage, the resultant first dot pattern thus having a property of high suppression of substrate fluorescence;

deriving a second dot design pattern to also provide the desired colorant combination for printing, the second dot design pattern further comprised of non-overlapping primary colorants including at least the colorant black, but with a minimized amount of the colorant yellow, arranged to create a relatively low paper coverage while having substantially similar average color appearance as the first dot design pattern under normal light, the resultant second dot pattern thus having a property of low suppression of substrate fluorescence; and, printing the first dot design pattern and the second dot design pattern in close proximity to each other on a substrate containing optical brightening agents such that the resultant printed substrate image suitably exposed to an ultra-violet light source, will yield a discernable pattern evident as a fluorescent mark, which is otherwise not viewable under normal lighting conditions.

16. The method for creating the fluorescent mark indicator of claim 15 further comprising where the first dot design pattern and the second dot design pattern are a close metameric color match under normal illumination but remain visually distinct in their response under ultra-violet light.

17. The method for creating the fluorescent mark indicator of claim 15 wherein the first dot design pattern and the second dot design pattern are derived from a first printer model that predicts a perceived color signal under normal light and a second printer model that predicts a perceived color signal under UV light.

18. The method for creating the fluorescent mark indicator of claim 17 wherein the perceived color signal under UV light predicted by the second printer model is based upon luminance or a direct correlate thereof.

19. The method for creating the fluorescent mark indicator of claim 17 wherein the second printer model predicts UV luminance by calculating the fractional area coverage of the paper substrate.

20. The method for creating the fluorescent mark indicator of claim 19 wherein the second printer model predicts UV luminance as a weighted average of the UV luminance of solid C, M, Y, K and bare substrate, wherein the weights in the weighted average calculation are derived from fractional area coverage of C, M, Y, K and bare substrate.

21. The method for creating the fluorescent mark indicator of claim 20 wherein the fractional area coverage of C, M, Y, K and bare substrate are obtained from characterization measurements obtained for the case of normal light.

* * * * *